US011917732B1

(12) United States Patent
Li

(10) Patent No.: US 11,917,732 B1
(45) Date of Patent: Feb. 27, 2024

(54) MECHANISM CAPABLE OF PROVIDING TIME-SHARING SIGNAL PORT SUPPORTING BUTTON AND ARGB PROTOCOLS

(71) Applicant: PixArt Imaging Inc., Hsin-Chu (TW)

(72) Inventor: Jr-Yi Li, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 17/985,932

(22) Filed: Nov. 14, 2022

(51) Int. Cl.
*H05B 45/20* (2020.01)
*H05B 47/16* (2020.01)

(52) U.S. Cl.
CPC ............. *H05B 45/20* (2020.01); *H05B 47/16* (2020.01)

(58) Field of Classification Search
CPC ........ H05B 45/10; H05B 45/20; H05B 45/30; H05B 47/10; H05B 47/175
See application file for complete search history.

(56) References Cited

U.S. PATENT DOCUMENTS

2004/0160199 A1* 8/2004 Morgan .................... G09G 3/14 315/312
2020/0077484 A1* 3/2020 Li .......................... H05B 45/20

* cited by examiner

*Primary Examiner* — Jimmy T Vu
(74) *Attorney, Agent, or Firm* — Winston Hsu

(57) ABSTRACT

An optical device includes: an addressable LED group having ARGB LED units which are connected in series and controlled serially by a specific sequence of digital signals to display colors; an input interface circuit, configured to sense a user's control state; a control circuit, coupled to the addressable LED group and the input interface circuit; a processing circuit, for providing an optical operation; a specific signal port of the processing circuit, coupled to the addressable LED group and coupled to the input interface circuit through the control circuit, configured to receive the specific sequence of digital signals and then transmit the specific sequence of digital signals into an input of a first addressable LED unit in the addressable LED group, and configured to receive an output control signal generated from the input interface circuit by sensing the user's control state.

20 Claims, 5 Drawing Sheets

Data transfer time(TH+TL=1.25 μs±600ns)

| | | | |
|---|---|---|---|
| T0H | 0 code ,high voltage time | 0.4 μs | ±150ns |
| T1H | 1 code ,high voltage time | 0.8 μs | ±150ns |
| T0L | 0 code ,low voltage time | 0.85 μs | ±150ns |
| T1L | 0 code ,low voltage time | 0.45 μs | ±150ns |
| Reset | Low voltage time | Above 50 μs | |

MECHANISM CAPABLE OF PROVIDING TIME-SHARING SIGNAL PORT SUPPORTING BUTTON AND ARGB PROTOCOLS

BACKGROUND OF THE INVENTION

1. Field of the Invention

The invention relates to an optical device mechanism, and more particularly to an optical device and corresponding method.

2. Description of the Prior Art

Generally speaking, a conventional optical navigation device may need different signal ports/pins to respectively support a group of pulse-width-modulation (PWM) red/green/blue (RGB) light-emission-diode (LED) units in a PWM RGB protocol/mode to output and control light emissions and also may need other signal ports/pins to support input interface circuits such as buttons to sense a user's input control states. The number of signal ports/pins will be larger if the conventional optical navigation device has a more complicated design, and thus the size of the needed chip area will be larger.

SUMMARY OF THE INVENTION

Therefore one of the objectives of the invention is to provide an optical device and method, to solve the above-mentioned problems.

According to embodiments of the invention, an optical device is disclosed. The optical device comprises an addressable light-emission-diode (LED) group, an input interface circuit, a control circuit, a processing circuit, and a specific signal port of the processing circuit. The addressable LED group has a plurality of addressable red/green/blue (ARGB) LED units which are connected in series and controlled serially by a specific sequence of digital signals to display colors. The input interface circuit is configured to sense a user's control state. The control circuit is coupled to the addressable LED group and the input interface circuit. The processing circuit is used for providing an optical operation. The specific signal port of the processing circuit is coupled to the addressable LED group and coupled to the input interface circuit through the control circuit, and it is configured to receive the specific sequence of digital signals and then transmit the specific sequence of digital signals into an input of a first addressable LED unit in the addressable LED group in an addressable RGB mode, and configured to receive an output control signal generated from the input interface circuit by sensing the user's control state in an input control mode.

According to the embodiments, a method of an optical device is disclosed. The method comprises: providing an addressable light-emission-diode (LED) group having a plurality of addressable red/green/blue (ARGB) LED units which are connected in series and controlled serially by a specific sequence of digital signals to display colors; providing an input interface circuit to sense a user's control state; providing a control circuit coupled to the addressable LED group and the input interface circuit; using a processing circuit for providing an optical operation; and, providing a specific signal port of the processing circuit, coupled to the addressable LED group and coupled to the input interface circuit through the control circuit, and using the specific signal port to receive the specific sequence of digital signals and then transmit the specific sequence of digital signals into an input of a first addressable LED unit in the addressable LED group in an addressable RGB mode and to receive an output control signal generated from the input interface circuit by sensing the user's control state in an input control mode.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution mechanism of an optical device capable of simultaneously supporting an addressable red/green/blue (ARGB) protocol/mode and an input control protocol/mode (e.g. a button protocol/mode) by using a specific single signal port such as a single signal pin. The specific signal port is a time-sharing signal port used for both the button protocol/mode and the ARGB protocol/mode, and the specific signal port is an input/output (I/O) pin with/having multiple functions.

Figure 1:
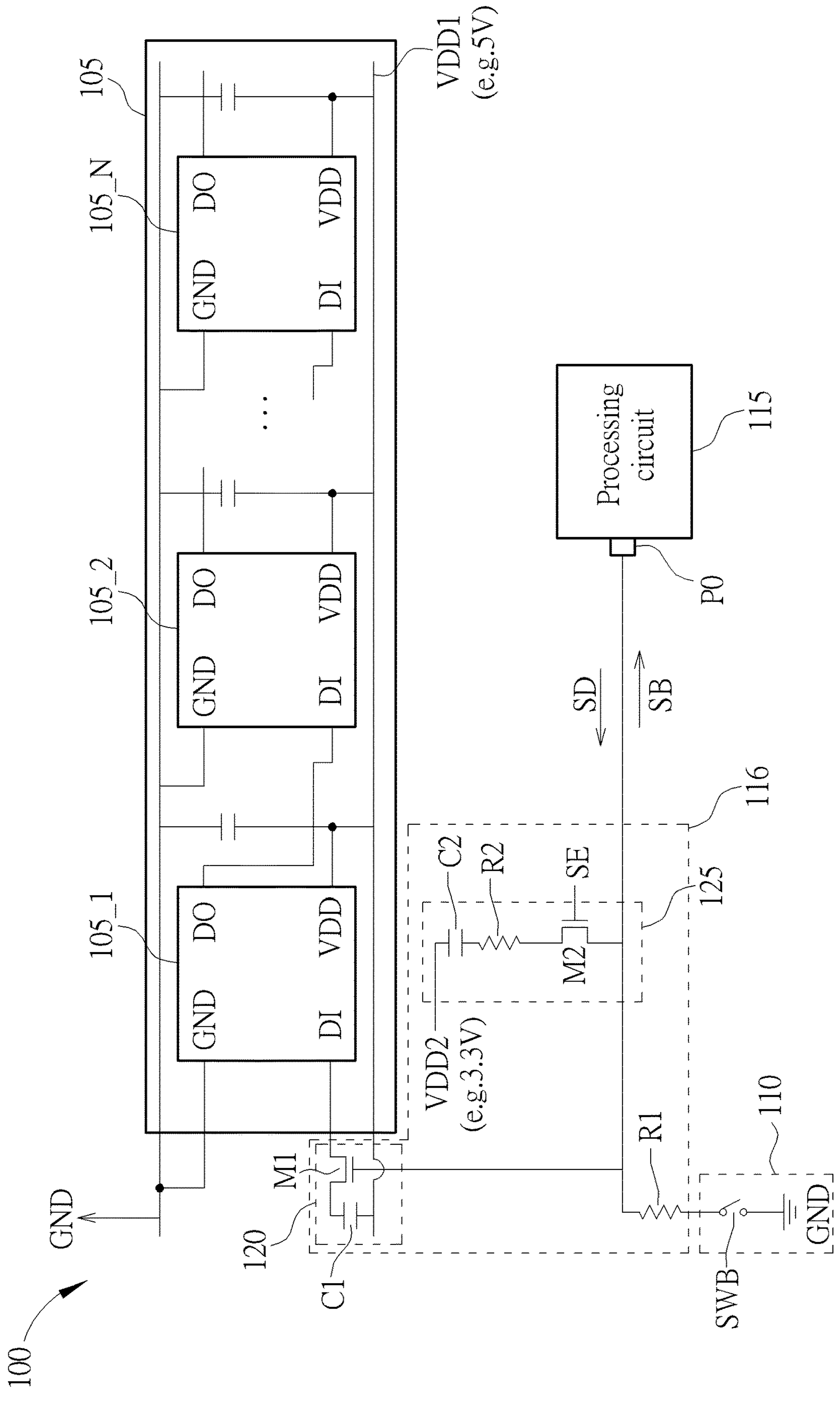
FIG. 1 is a diagram of an optical device according to an embodiment of the invention.
Figure 2:
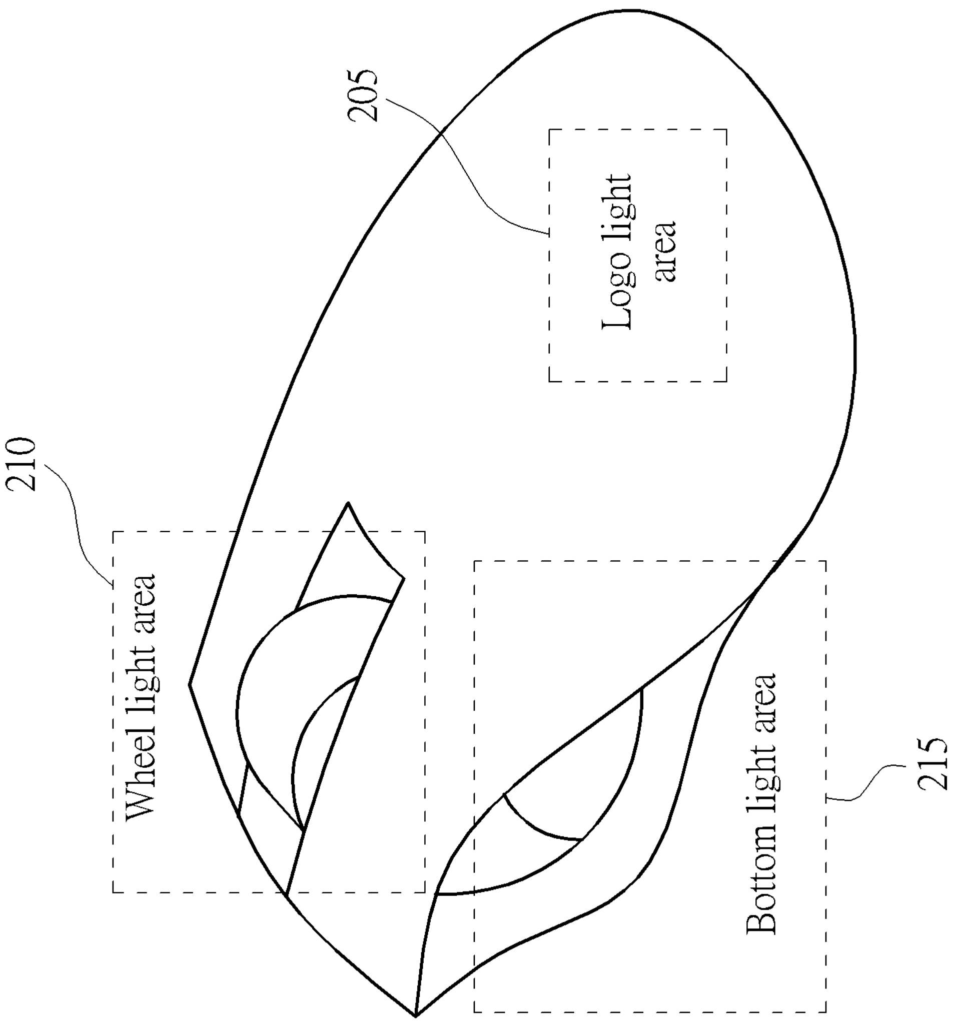
FIG. 2 is a diagram of an example of different light areas of the optical device in FIG. 1 according to an embodiment of the invention.

Refer to FIG. 1 in conjunction with FIG. 2. FIG. 1 is a diagram of an optical device 100 according to an embodiment of the invention. FIG. 2 is a diagram of an example of different light areas of the optical device 100 in FIG. 1 according to an embodiment of the invention. In FIG. 1, the optical device 100 for example is an optical navigation device such as an optical mouse device (but not limited) in FIG. 2, and it comprises an addressable light-emission-diode (LED) group 105 having a plurality of ARGB LED units 105_1, 105_2, . . . , and 105_N, an input interface circuit 110, a processing circuit 115 arranged for providing an optical function/operation such as an optical navigation function/operation, a control circuit 116, and the processing circuit's 115 specific signal port/pin P0 that is coupled to the addressable LED group 105 and coupled to the input interface circuit 110 through the control circuit 116. The control circuit 116 comprises a first impedance unit such as a resistor R1 (i.e. a button resistor), a first control circuit 120, and a second control circuit 125. The first control circuit 120 comprises a capacitor C1 and a transistor M1. The second control circuit 125 comprises a second impedance unit such as a resistor R2, a capacitor C2, and a transistor M2.

The LED units 105_1, 105_2, . . . , and 105_N are connected in series, and they may be configured on the same LED strip or different LED strips. A specific sequence of digital signals SD are serially generated by and outputted from the processing circuit 115 through the signal pin P0 into the LED units 105_1, 105_2, . . . , and 105_N so as to respectively control the LED units 105_1, 105_2, . . . , and 105_N to emit R/G/B lights (or equivalently display R/G/B colors); that is, the signal pin P0 in this situation is used as a signal output pin for the processing circuit 115. Each LED unit may comprise red, green, and blue diodes of red, green, and blue colors (not shown in FIG. 1), and the sequence of digital signals SD for example has N digital signals respectively provided for the LED units 105_1, 105_2, . . . , and 105_N. Each digital signal SD comprises three control data, e.g. three color control bytes (total 24 bits), which are respectively controlling whether the red, green, and blue diodes emit corresponding light and light amounts. In addition, the number N for example is equal to 20 (but not limited).

In FIG. 2, the addressable RGB LED units 105_1, 105_2, . . . , and 105_N for example can be disposed in different light areas such as a first light area (i.e. a logo light area 205) to show and display a logo image of the optical device 100 for the user, a second light area (i.e. a wheel light area 210) to emit light to show and emphasis the position/area of the wheel of the optical device 100, and a third light area (i.e. a bottom light area 215) to emit light to show and display the position/area of the bottom of the optical device 100. This example is not meant to be a limitation.

Further, each LED unit has a ground terminal coupled to the ground level GND, a supply terminal coupled to the power supply level VDD1 such as 5Volts (but not limited), a data input terminal DI, and a data output terminal DO. In this embodiment, the first one LED unit's 105_1 data input terminal DI is coupled to the signal pin P0 through the first control circuit 120. The transistor M1 has a control terminal coupled to and controlled by the sequence of digital signals SD, a first terminal coupled to the capacitor C1, and a second terminal coupled to the data input terminal DI of the first one LED unit 105_1; the first control circuit 120 may be optional in other embodiments. The data input terminals DI of the other LED units 105_2-105_N are respectively coupled to the data output terminal DO of their previous LED units correspondingly, as shown in FIG. 1. The processing circuit 115 can send the sequence of digital signals SD to the serially-connected LED units 105_1, 105_2, . . . , and 105_N to display, control or change different colors of the LED units 105_1, 105_2, . . . , and 105_N by using only one signal pin P0.

The input interface circuit 110 for example is a pressable button circuit (but not limited) arranged for sensing the user's control state/behavior, and in one embodiment it may comprise a clickable button switch SWB such as a push-button switch or a toggle switch. The clickable button switch SWB has a first end and a second end, and the first end (e.g. the bottom end in FIG. 1) is coupled to the ground level GND while the second end (i.e. the top end in FIG. 1) is coupled to the specific impedance unit R1. The specific impedance unit R1 has a first end coupled to the clickable button switch SWB and a second end coupled to the specific signal port P0. The input interface circuit 110 is arranged to sense the user's control behavior to generate and send a user control signal into the processing circuit 115 through the signal pin P0; that is, the signal pin P0 in this situation is used as a signal input pin for the processing circuit 115.

By doing so, the specific signal port/pin P0 can be configured to receive the specific sequence of digital signals SD and then transmit the specific sequence of digital signals SD into the input DI of the first addressable LED unit 105_1 in the addressable LED group 105 in the ARGB protocol/mode, and also it can be configured to receive a control signal such as a button control signal SB generated from the input interface circuit 110 by sensing the user's control state in the input control protocol/mode.

The second capacitor C2 has a first end coupled to a second supply voltage level VDD2 which is lower than the first supply voltage level VDD1 and has a second end. The second supply voltage level VDD2 for example is 3.3Volts (but not limited). In addition, the second impedance unit R2 has a first end coupled to the second end of the second capacitor C2 and has a second end. The second impedance value of the second impedance unit R2 is smaller than an impedance value of the specific impedance unit R1. The impedance value of the specific impedance unit R1 may be at least larger than twice of the impedance value of the second impedance unit R2. For example, the impedance value of the second impedance unit R2 is 10 KΩ (but not limited), and the impedance value of the first impedance unit R1 is 20 KΩ (but not limited). In addition, the second transistor M2 is coupled between the second end of the second impedance unit R2 and the specific signal port P0.

For the operation, when it is in the ARGB protocol/mode, the control signal SE, generated by and sent from the processing circuit 115, is at a low logic level, and the second transistor M2 is disabled and turned off by the control signal SE. In this situation, the capacitor C2 and resistor R2 are disconnected from the signal pin P0, and the clickable button switch SWB is unpressed and at the open state at this timing. The button control signal SB generated from the input interface circuit 110 maybe at the low level such as ground level, and based on the resistor R1 the specific sequence of digital signals SD will not affected by the button control signal SB at this timing and can be received by and then transmitted from the specific signal port P0 to control the plurality of ARGB LED units 105_1-105_N through the control circuit 120. That is, the voltage levels of the sequence of digital signals SD will not be affected by the clickable button switch SWB, so that the sequence of digital signals SD can still correctly enable or disable the transistor M1 to sequentially generate corresponding level transitions at the data input terminal DI of the first one LED unit 105_1. By doing so, the LED units 105_1-105_N can be correctly controlled by the sequence of digital signals SD to respectively emit corresponding R/G/B lights.

Figure 5:
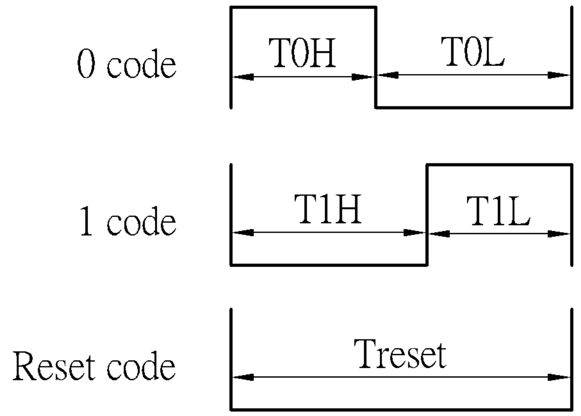
FIG. 5 is a diagram showing the definitions of the code bit '0' and code bit '1' according to an embodiment of the invention.

Alternatively, when it is in the button protocol/mode, the clickable button switch SWB is flipped and toggled due to the click behavior of the user, and thus the clickable button switch SWB changes its state into the closed state at this timing. In this situation, the level of the button control signal SB generated from the input interface circuit 110 may bounce, and the control signal SE becomes at the high logic level to enable and turn on the second transistor M2, so that the level of the button control signal SB can be finally at a high level for the signal pin P0. The level may merely enable the transistor M1 and does not cause a level transition, and the operation of the first one LED unit 105_1 will not be affected since in the ARGB protocol/mode the code bit '0' and code bit '1' are respectively defined by two level transitions with different high/low voltage time lengths during a specified data transfer time. FIG. 5 is a diagram showing the definitions of the code bit '0' and code bit '1' according to an embodiment of the invention. For example, the code bit '0' is defined by the high voltage time T0H (0.4 μS±150 nS) and the low voltage time T0L (0.85 μS±150 nS) during a data transfer time (1.25 μS±600 nS) , and the code bit '1' is defined by the high voltage time T1H (0.8 μS±150 nS) and the low voltage time T1L (0.45 μS±150 nS) during a data transfer time. Thus, the first one LED unit 105_1 will not erroneously decide a signal in the button protocol/mode as a signal of the ARGB protocol/mode. In this situation, the specific signal port P0 is used to receive the button control signal SB generated from the input interface circuit 110, and equivalently the capacitor C2, the impedance unit R2, and the transistor M2 are used to provide a reference voltage level at the signal port P0 for the button control signal SB. By doing so, the processing circuit 115 can correctly receive the button control signal SB in the button protocol/mode to know that the user presses the clickable button switch SWB.

Figure 3:
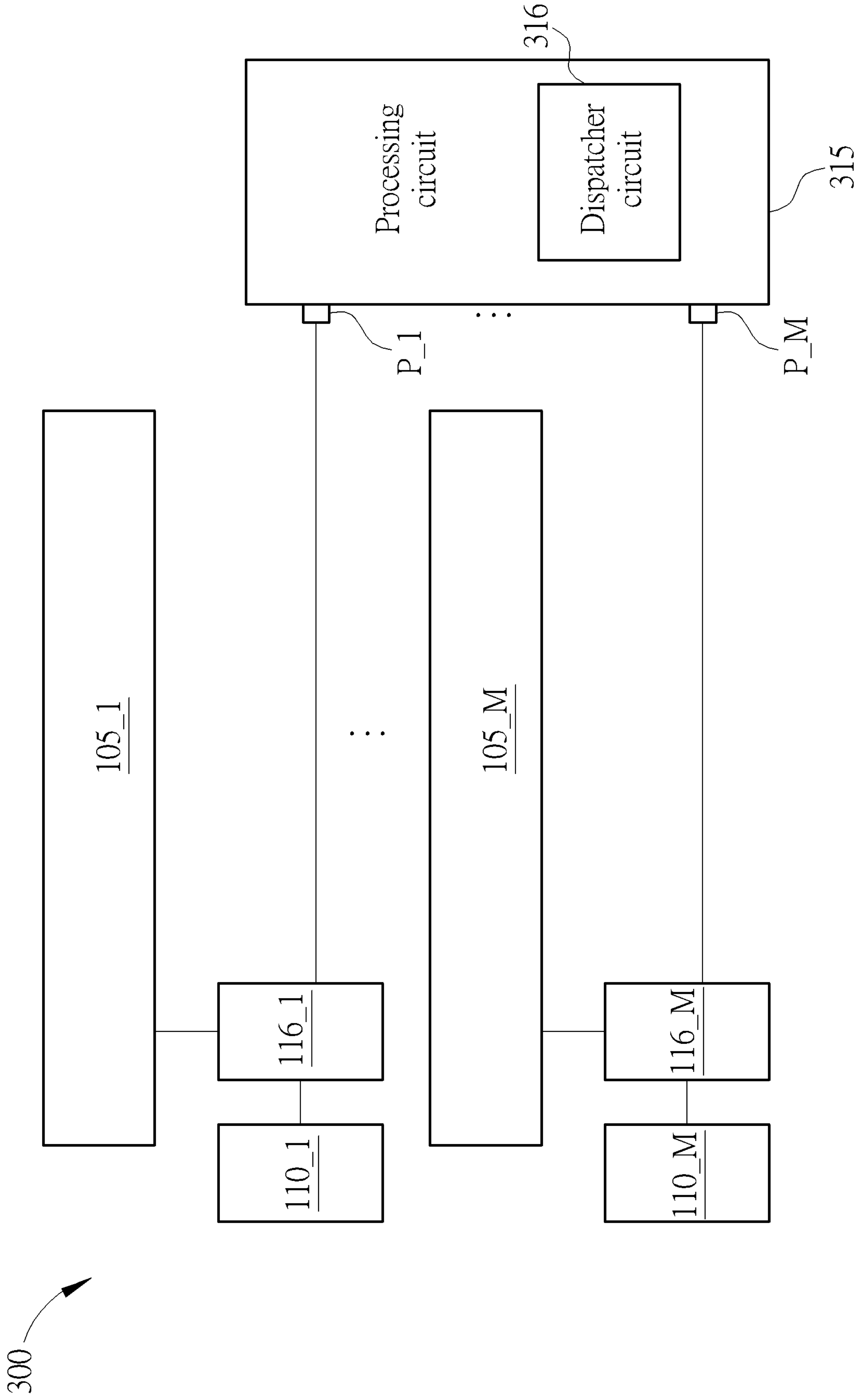
FIG. 3 is a diagram of an optical device according to another embodiment of the invention.

Further, in one embodiment, an optical device may comprise multiple sets of input interface circuits, control circuits, and addressable LED groups. FIG. 3 is a diagram of an optical device 300 according to another embodiment of the invention. The optical device 300 comprises the number M of multiple addressable LED groups 105_1-105_M, multiple input interface circuits 110_1-110_M, multiple control circuits 116_1-116_M, and a processing circuit 315 having multiple signal ports/pins P_1-P_M. The signal ports/pins P_1-P_M are respectively coupled to the input interface circuits 110_1-110_M and addressable LED groups 105_1-105_M through the control circuits 116_1-116_M, as shown in FIG. 3. For example, the number M for example is equal to three (but not limited). The functions and operations of the addressable LED groups 105_1-105_M, input interface circuits 110_1-110_M, control circuits 116_1-116_M, and processing circuit 315 are similar to those of the circuits having the same names in the embodiment of FIG. 1. The following table shows the example of three signal pins P_1, P_2, and P_3 having different functions in different modes:

| Pin/function | Button mode | ARGB mode | PWM RGB mode |
|---|---|---|---|
| P_1 | B_1 | 105_1 | Red |
| P_2 | B_2 | 105_2 | Green |
| P_3 | B_3 | 105_3 | Blue |

For instance, the signal pins P_1, P_2, and P_3 are used as signal input pins respectively for receiving the user control signals generated from the different button circuits B_1, B_2, and B_3 in the button protocol/mode. In the ARGB protocol/mode, the signal pins P_1, P_2, and P_3 are used as signal output pins respectively for outputting the different sequence of digital control signals to the addressable LED groups 105_1, 105_2, and 105_3. In the pulse-width-modulation (PWM) RGB protocol/mode, the signal pins P_1, P_2, and P_3 are used as signal output pins respectively for outputting the different sequence of red, green, and blue control signals to the addressable LED groups 105_1, 105_2, and 105_3. For example, the addressable LED group 105_1 in the ARGB mode can be controlled by the sequence of digital control signals to emit R/G/B light, and in the PWM RGB mode it may be controlled by a sequence of red control signals to emit red light. This is not intended to be a limitation of the invention.

Figure 4:
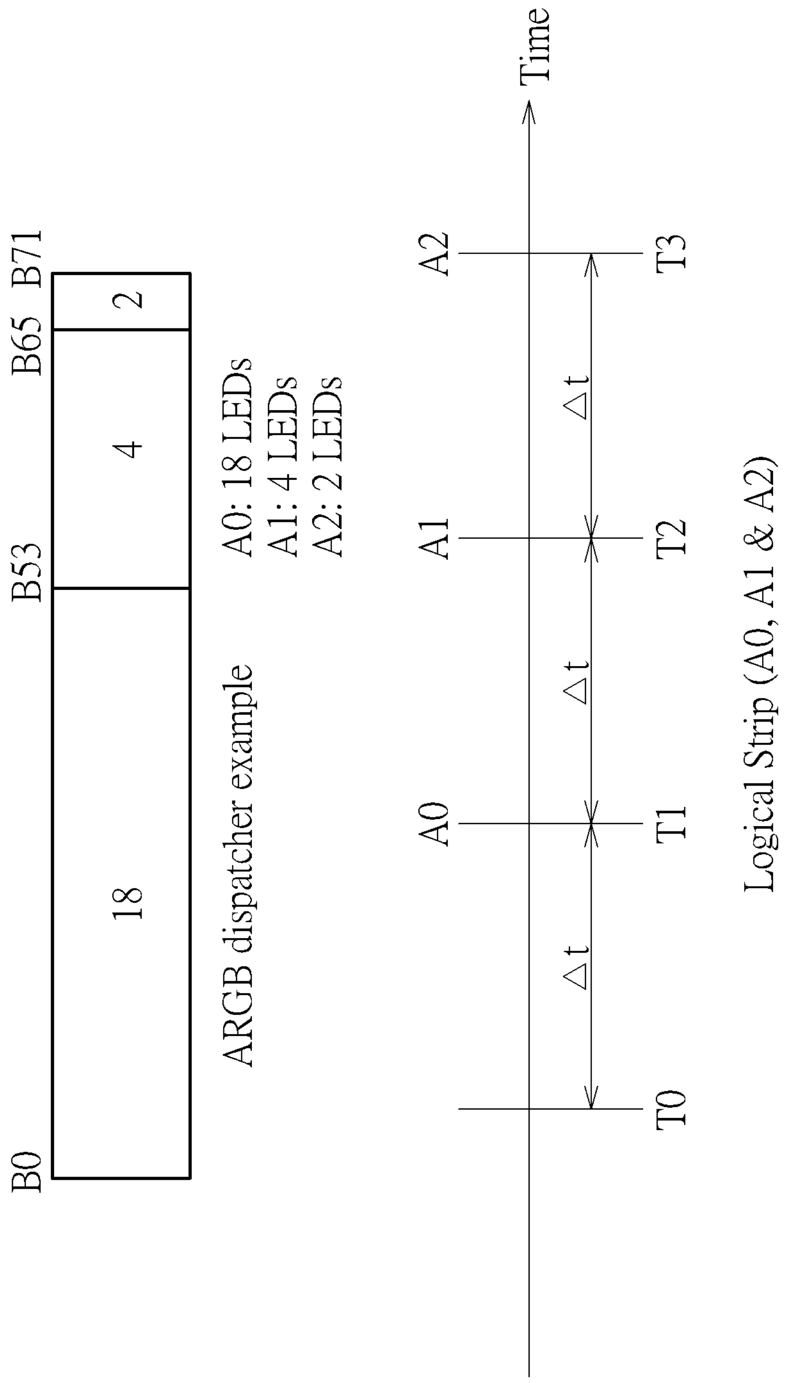
FIG. 4 is a diagram of an example of aggregating the signal ports/pins P_1, P_2, and P_3 to format the addressable LED groups into a single one logical LED strip.

The processing circuit 315 further comprises a dispatcher circuit 316 which can be used to aggregate multiple signal pins to format the corresponding addressable LED groups into a single one logical LED strip or multiple logical LED strips. FIG. 4 is a diagram of an example of aggregating the signal pins P_1, P_2, and P_3 to format the addressable LED groups 105_1, 105_2, and 105_3 into a single one logical LED strip. For example, initially the addressable LED groups 105_1, 105_2, and 105_3 may be respectively three different logical LED strips A0, A1, and A2, wherein the enabled/activated LED units of the LED group 105_1 may be 18, the enabled/activated LED units of the LED group 105_2 may be 4, and the enabled/activated LED units of the LED group 105_3 may be 2. That is, the logical LED strips A0, A1, and A2 respectively and equivalently have 18, 4, and 2 LED units to emit lights. The dispatcher circuit 316 is used to equivalently aggregate the LED units of the logical LED strips A0, A1, and A2 into 24 LED units disposed in a single logical LED strip. The logical LED strips A0, A1, and A2 may be disposed at different light areas of the optical device 300, e.g. the logo light area, wheel light area, and bottom light area; however, this is not intended to be a limitation of the invention.

For the logical LED strip A0, the dispatcher circuit 316, used as an ARGB protocol manager circuit, is arranged to trigger and execute the ARGB protocol operation of the logical LED strip A0 to serially send a first sequence of digital control signals into the LED units of the logical LED strip A0 during a first time period such as a time length being equal to the polling time period (e.g. 1 milliseconds) of an optical navigation device; the first time period starts at T0 and ends at T1. The first sequence of digital control signals may carry 18 control data each having three color control bytes if the logical LED strip A0 has 18 enabled LED units, i.e. total 54 data bytes B0-B53. Similarly, for the logical LED strip A1, the dispatcher circuit 316, used as the ARGB protocol manager circuit, is arranged to trigger and execute the ARGB protocol operation of the logical LED strip A1 to serially send a second sequence of digital control signals into the LED units of the logical LED strip A1 during a second time period such as the time length being equal to the polling time period of the optical navigation device; the second time period starts at T1 and ends at T2. The second sequence of digital control signals may carry 4 control data each having three color control bytes if the logical LED strip A1 has 4 enabled LED units, i.e. total 12 data bytes B54_B65. Similarly, for the logical LED strip A2, the dispatcher circuit 316, used as the ARGB protocol manager circuit, is arranged to trigger and execute the ARGB protocol operation of the logical LED strip A2 to serially send a third sequence of digital control signals into the LED units of the logical LED strip A2 during a third time period such as the time length being equal to the polling time period of the optical navigation device; the third time period starts at T2 and ends at T3. The third sequence of digital control signals may carry 2 control data each having three color control bytes if the logical LED strip A2 has 2 enabled LED units, i.e. total 6 data bytes B66-B71. That is, the total byte number of ARGB control data generated and outputted by the dispatcher circuit 316 is 72.

In practice, the dispatcher circuit 316 may comprise a buffer circuit (not shown in FIG. 4), and the buffer circuit for example may be used to buffer the first sequence of digital control signals, the second sequence of digital control signals, and the third sequence of digital control signals. From T0 to T1, in the ARGB mode, the first sequence of digital control signals is transmitted and outputted from a first signal pin such as P_1, and no digital control signals are outputted from the other signal pins. From T1 to T2, in the ARGB mode, the second sequence of digital control signals is transmitted and outputted from a second signal pin such as P_2, and no digital control signals are outputted from the other signal pins. From T2 to T3, in the ARGB mode, the third sequence of digital control signals is transmitted and outputted from a third signal pin such as P_3, and no digital control signals are outputted from the other signal pins.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. An optical device, comprising:

an addressable light-emission-diode (LED) group having a plurality of addressable red/green/blue (ARGB) LED units which are connected in series and controlled serially by a specific sequence of digital signals to display colors;

an input interface circuit, configured to sense a user's control state;

a control circuit, coupled to the addressable LED group and the input interface circuit;

a processing circuit, for providing an optical operation; and a specific signal port of the processing circuit, coupled to the addressable LED group and coupled to the input interface circuit through the control circuit, configured to receive the specific sequence of digital signals and then transmit the specific sequence of digital signals into an input of a first addressable LED unit in the addressable LED group in an addressable RGB mode, and configured to receive an output control signal generated from the input interface circuit by sensing the user's control state in an input control mode.

2. The optical device of claim 1, wherein the input interface circuit is a pressable button circuit.

3. The optical device of claim 2, wherein the pressable button circuit comprises:

a clickable button switch, having a first end and a second end, the first end being coupled to a ground level.

4. The optical device of claim 3, wherein the control circuit comprises:

a first impedance unit, coupled between the second end of the clickable button switch and the specific signal port.

5. The optical device of claim 4, wherein the control circuit further comprises:

a specific capacitor, having a first end coupled to a first supply voltage level and having a second end; and a specific transistor, having a first terminal coupled to the input of the first addressable LED unit, having a second terminal coupled to the second end of the specific capacitor, and a control terminal coupled to a second end of the first impedance unit and coupled to the specific signal port, wherein the control terminal is configured to receive the specific sequence of digital signals to control the plurality of addressable RGB LED units.

6. The optical device of claim 5, wherein the control circuit further comprises:

a second capacitor, having a first end coupled to a second supply voltage level lower than the first supply voltage level and having a second end;

a second impedance unit, having a first end coupled to the second end of the second capacitor and having a second end, a second impedance value of the second impedance unit is smaller than an impedance value of the first impedance unit; and a second transistor, coupled between the second end of the second impedance unit and the specific signal port;

wherein when the specific sequence of digital signals are received by and then transmitted from the specific signal port to control the plurality of addressable RGB LED units, the second transistor is disabled by a control signal; and, when the specific signal port is used to receive the output control signal generated from the input interface circuit, the second transistor is enabled by the control signal.

7. The optical device of claim 1, further comprising:

another addressable LED group having a plurality of ARGB LED units which are connected in series and controlled serially by another specific sequence of digital signals to display colors;

another input interface circuit, configured to sense a user's another control state;

another control circuit, coupled to the another addressable LED group and the another input interface circuit; and another specific signal port of the processing circuit, coupled to the another addressable LED group and coupled to the another input interface circuit through the another control circuit, configured to receive the another specific sequence of digital signals and then transmit the another specific sequence of digital signals into an input of another first addressable LED unit in the another addressable LED group in the addressable RGB mode, and configured to receive another output control signal generated from the another input interface circuit by sensing the user's another control state in the input control mode.

8. The optical device of claim 7, wherein the addressable LED group and the another addressable LED group are aggregated by the processing circuit into a single logical LED strip, and the addressable LED group and the another addressable LED group are used for different light areas of the optical device.

9. The optical device of claim 8, wherein the specific sequence of digital signals is transmitted from the processing circuit into the addressable LED group through the specific signal port during a first time period, and the another specific sequence of digital signals is transmitted from the processing circuit into the another addressable LED group through the another specific signal port during a second time period following the first time period.

10. The optical device of claim 9, wherein the first time period and the second time period are equal to a polling time period of the optical device.

11. A method of an optical device, comprising:

providing an addressable light-emission-diode (LED) group having a plurality of addressable red/green/blue (ARGB) LED units which are connected in series and controlled serially by a specific sequence of digital signals to display colors;

providing an input interface circuit to sense a user's control state;

providing a control circuit coupled to the addressable LED group and the input interface circuit;

using a processing circuit for providing an optical operation; and providing a specific signal port of the processing circuit, coupled to the addressable LED group and coupled to the input interface circuit through the control circuit, and using the specific signal port to receive the specific sequence of digital signals and then transmit the specific sequence of digital signals into an input of a first addressable LED unit in the addressable LED group in an addressable RGB mode and to receive an output control signal generated from the input interface circuit by sensing the user's control state in an input control mode.

12. The method of claim 11, wherein the input interface circuit is a pressable button circuit.

13. The method of claim 12, wherein the pressable button circuit is a clickable button switch having a first end and a second end, and the first end is coupled to a ground level.

14. The method of claim 13, wherein the control circuit comprises:

a first impedance unit, coupled between the second end of the clickable button switch and the specific signal port.

15. The method of claim 14, wherein the control circuit further comprises:

a specific capacitor, having a first end coupled to a first supply voltage level and having a second end; and a specific transistor, having a first terminal coupled to the input of the first addressable LED unit, having a second terminal coupled to the second end of the specific capacitor, and a control terminal coupled to a second end of the first impedance unit and coupled to the specific signal port, wherein the control terminal is configured to receive the specific sequence of digital signals to control the plurality of addressable RGB LED units.

16. The method of claim 15, wherein the control circuit further comprises:

a second capacitor, having a first end coupled to a second supply voltage level lower than the first supply voltage level and having a second end;

a second impedance unit, having a first end coupled to the second end of the second capacitor and having a second end, a second impedance value of the second impedance unit is smaller than an impedance value of the first impedance unit; and a second transistor, coupled between the second end of the second impedance unit and the specific signal port;

wherein when the specific sequence of digital signals are received by and then transmitted from the specific signal port to control the plurality of addressable RGB LED units, the second transistor is disabled by a control signal; and, when the specific signal port is used to receive the output control signal generated from the input interface circuit, the second transistor is enabled by the control signal.

17. The method of claim 11, further comprising:

providing another addressable LED group having a plurality of ARGB LED units which are connected in series and controlled serially by another specific sequence of digital signals to display colors;

providing another input interface circuit to sense a user's another control state;

providing another control circuit coupled to the another addressable LED group and the another input interface circuit; and providing another specific signal port of the processing circuit, coupled to the another addressable LED group and coupled to the another input interface circuit through the another control circuit, and using the another specific signal port to receive the another specific sequence of digital signals and then transmit the another specific sequence of digital signals into an input of another first addressable LED unit in the another addressable LED group in the addressable RGB mode and to receive another output control signal generated from the another input interface circuit by sensing the user's another control state in the input control mode.

18. The method of claim 17, wherein the addressable LED group and the another addressable LED group are aggregated by the processing circuit into a single logical LED strip, and the addressable LED group and the another addressable LED group are used for different light areas of the optical device.

19. The method of claim 18, wherein the specific sequence of digital signals is transmitted from the processing circuit into the addressable LED group through the specific signal port during a first time period, and the another specific sequence of digital signals is transmitted from the processing circuit into the another addressable LED group through the another specific signal port during a second time period following the first time period.

20. The method of claim 19, wherein the first time period and the second time period are equal to a polling time period of the optical device.

* * * * *